United States Patent
Nelson (10) Patent No.: US 11,010,542 B2
(45) Date of Patent: May 18, 2021

(54) INTERACTIVE ELECTRONIC WHITEBOARD APPLIANCE WITH ADAPTIVE APPLICATION MANAGEMENT

(71) Applicant: Steven A. Nelson, San Jose, CA (US)

(72) Inventor: Steven A. Nelson, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 182 days.

(21) Appl. No.: 15/014,982

(22) Filed: Feb. 3, 2016

(65) Prior Publication Data

US 2017/0220537 A1   Aug. 3, 2017

(51) Int. Cl.
| | |
|---|---|
| G06F 3/0481 | (2013.01) |
| G06F 3/0482 | (2013.01) |
| G06F 3/0483 | (2013.01) |
| G06F 3/0484 | (2013.01) |
| G06F 40/169 | (2020.01) |

(52) U.S. Cl.
CPC ........ *G06F 40/169* (2020.01); *G06F 3/04842* (2013.01); *G06F 3/04845* (2013.01); *G06F 2203/04804* (2013.01)

(58) Field of Classification Search
CPC ...... G06F 17/30; G06F 17/241; G06F 3/0481; G06F 40/169; G06F 3/0482; G06F 3/04842; G06F 3/04845; G06F 2203/04804
USPC ........................................................ 715/202
See application file for complete search history.

(56) References Cited

U.S. PATENT DOCUMENTS

| | | | | |
|---|---|---|---|---|
| 5,805,163 A * | 9/1998 | Bagnas | ................ | G06F 3/0481 715/768 |
| 6,333,753 B1 * | 12/2001 | Hinckley | ............ | G06F 3/03543 345/156 |
| 7,250,955 B1 * | 7/2007 | Beeman | .................. | G06F 9/542 345/592 |
| 7,429,993 B2 * | 9/2008 | Hui | ........................ | G06F 3/0481 345/592 |
| 7,956,869 B1 * | 6/2011 | Gilra | ..................... | G06F 3/0481 345/157 |
| 8,495,514 B1 * | 7/2013 | Ludolph | ............... | G06F 3/0481 715/768 |

(Continued)

OTHER PUBLICATIONS

Jason Moofang, Applying Kwin Blur to Transparent Konsole, Oct. 1, 2013; https://yuenhoe.com/blog/2013/10/applying-kwin-blur-to-transparent-konsoleyakuake-windows/.*

*Primary Examiner* — Cesar B Paula
*Assistant Examiner* — Carl E Barnes, Jr.
(74) *Attorney, Agent, or Firm* — Hickman Becker Bingham Ledesma LLP; Edward A. Becker (57) ABSTRACT

An interactive whiteboard appliance includes the capability to instantiate and manage multiple windows on the interactive whiteboard appliance in a manner that allows information in multiple windows to be viewed concurrently by dynamically selecting and changing the opacity of one or more portions of a topmost window in response to one or more conditions. The one or more conditions may include one or more user actions made with respect to the topmost window or the one or more conditions may be related to a window other than the topmost window, such as detection of an audio signal in a non-topmost window. Opacity may be selectively changed on a region-by-region basis and graphical user interface controls may be provided to allow users to specify different opacity levels.

18 Claims, 6 Drawing Sheets

(56) References Cited

U.S. PATENT DOCUMENTS

| | | | | |
|---|---|---|---|---|
| 8,806,354 | B1* | 8/2014 | Hyndman | G06F 3/04883 |
| | | | | 709/204 |
| 9,305,374 | B2* | 4/2016 | Kocienda | G06T 11/001 |
| 2002/0026323 | A1* | 2/2002 | Sakaguchi | G06Q 10/10 |
| | | | | 715/230 |
| 2004/0236830 | A1* | 11/2004 | Nelson | H04L 29/06027 |
| | | | | 709/204 |
| 2006/0248471 | A1* | 11/2006 | Lindsay | G06F 3/0481 |
| | | | | 715/800 |
| 2006/0253791 | A1* | 11/2006 | Kuiken | G06F 3/0481 |
| | | | | 715/766 |
| 2006/0294475 | A1* | 12/2006 | Holecek | G06F 3/0481 |
| | | | | 715/781 |
| 2007/0245256 | A1* | 10/2007 | Boss | G06F 3/0481 |
| | | | | 715/768 |
| 2010/0110099 | A1* | 5/2010 | Averett | G06F 16/3328 |
| | | | | 345/592 |
| 2010/0245563 | A1* | 9/2010 | Golovchinsky | H04N 7/18 |
| | | | | 348/135 |
| 2011/0202424 | A1* | 8/2011 | Chun | G06F 3/0481 |
| | | | | 705/26.8 |
| 2011/0244937 | A1* | 10/2011 | Yamashita | A63F 13/80 |
| | | | | 463/9 |
| 2012/0166952 | A1* | 6/2012 | Alexandrov | G06Q 10/101 |
| | | | | 715/730 |
| 2014/0281875 | A1* | 9/2014 | Branton | G06F 17/241 |
| | | | | 715/230 |
| 2014/0298153 | A1* | 10/2014 | Tsujimoto | G02B 21/365 |
| | | | | 715/232 |
| 2017/0013226 | A1* | 1/2017 | Trepanier | H04N 5/247 |

\* cited by examiner

IWB Appliance Powers Up and IWB Process is Started — 302

IWB Process Instantiates an Annotation Window in Full Screen Mode and Designated as a Topmost Window — 304

IWB Process Instantiates an Web Browser Window in Full Screen Mode and Designated as a Non-Topmost Window — 306

IWB Process Selects the Opacity Level for the Annotation Window to Allow Content From Both the Annotation Window and the Web Browser Window to be Viewed Concurrently — 308

IWB Process Changes the Opacity Level for the Annotation Window in Respond to One or More Conditions — 310

- Current Opacity Level: 75%
- ○ High Opacity (90%)
- ● Medium-High Opacity (75%)
- ○ Medium Opacity (50%)
- ○ Medium-Low Opacity (25%)
- ○ Low Opacity (10%)
- + Increase Opacity
- − Decrease Opacity

402

Set Default Opacity Level: 75%  404

Set Time Threshold for Returning to the Default Opacity Level: 3 mins  406

Set Opacity by Region  408

| State/Condition | Opacity Level | Adjust |
|---|---|---|
| Pen Hover | 75% | + − |
| Pen Contact / Writing | 90% | + − |
| Zoom | 75% | + − |
| Erase | 75% | + − |
| Undo / Redo | 75% | + − |
| Change of Pen Attributes | 75% | + − |
| Page Change | 75% | + − |
| Activity in Web browser window | 25% | + − |
| Extended Activity in Web browser window | 10% | + − |

INTERACTIVE ELECTRONIC WHITEBOARD APPLIANCE WITH ADAPTIVE APPLICATION MANAGEMENT

FIELD OF THE INVENTION

Embodiments relate generally to interactive electronic whiteboard appliances.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Interactive electronic whiteboard appliances allow users to view and collaborate on electronic information, such as electronic documents and other information. This includes using an electronic pen to make annotations on existing electronic documents and drawing free-hand diagrams via an annotation window that provides a drawing space. Some interactive electronic whiteboard appliances are configured with Web browser functionality that allows videoconferencing sessions to be conducted with other devices via a Web browser window on the interactive electronic whiteboard appliance, further increasing their usefulness.

One of the issues with interactive whiteboard appliances that use both an annotation window and a Web browser window concurrently is how to manage the display of the windows, given that both types of windows are designed to be displayed in full screen mode. One approach is to display both windows in full screen mode with one of the two windows on top, and provide controls for switching between the two windows. This approach limits users to viewing either the annotation window or the Web browser window that contains the videoconferencing session, and requires switching back and forth, which provides an unfavorable user experience. Another approach is to display the Web browser window as a smaller "floating" window on top of the annotation window, so that both windows are visible concurrently. Using a smaller Web browser window, however, makes it more difficult to see the participants in the videoconferencing session, particularly with groups of participants. It is also more difficult to use the videoconferencing session controls, which may be too small or not visible. In addition, the Web browser window obscures a portion of the annotation window, reducing the size of the drawing space.

SUMMARY

An interactive whiteboard appliance includes a display, a communications interface, one or more processors, one or more memories, an operating system executing on the interactive whiteboard appliance and having an application programming interface that provides access to functionality supported by the operating system and an interactive whiteboard application configured to cause an annotation window to be instantiated on the interactive whiteboard appliance, displayed on the display of the interactive whiteboard appliance and designated as a topmost window. The interactive whiteboard application is further configured to cause a Web browser window to be instantiated on the interactive whiteboard appliance, displayed on the display of the interactive whiteboard appliance and designated as a non-topmost window. The annotation window is displayed at least partially on top of the Web browser window on the display of the interactive whiteboard appliance. The interactive whiteboard application is further configured to select an opacity level of at least a portion of the annotation window to allow at least a portion of the Web browser window that would otherwise be visually obscured by the at least a portion of the annotation window to be visually seen through the at least a portion of the annotation window for which the opacity level was selected.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
  II. System Architecture
  III. Managing Windows Using Opacity
    A. Conditions for Changing Opacity
    B. Opacity Levels and Controls
    C. Regions and Color Shifting
  IV. IMPLEMENTATION MECHANISMS

I. Overview

An interactive whiteboard appliance includes the capability to instantiate and manage multiple windows on the interactive whiteboard appliance in a manner that allows information in multiple windows to be viewed concurrently to provide a more favorable user experience. This may include the capability to allow multiple windows to be viewed concurrently in full screen mode by dynamically selecting and changing the opacity of one or more portions of a topmost window in response to one or more conditions. The one or more conditions may include one or more user actions made with respect to the topmost window, such as a user positioning a pen or stylus within a specified distance of, or in contact with, a screen of the interactive whiteboard appliance, or a user selection of a graphical user interface control. The one or more conditions may be related to a window other than the topmost window, such as detection of an audio signal in a non-topmost window. Embodiments include changing opacity on a region-by-region basis, providing graphical user interface controls to allow users to specify different opacity levels, and performing color shifting.

II. System Architecture

Figure 1:
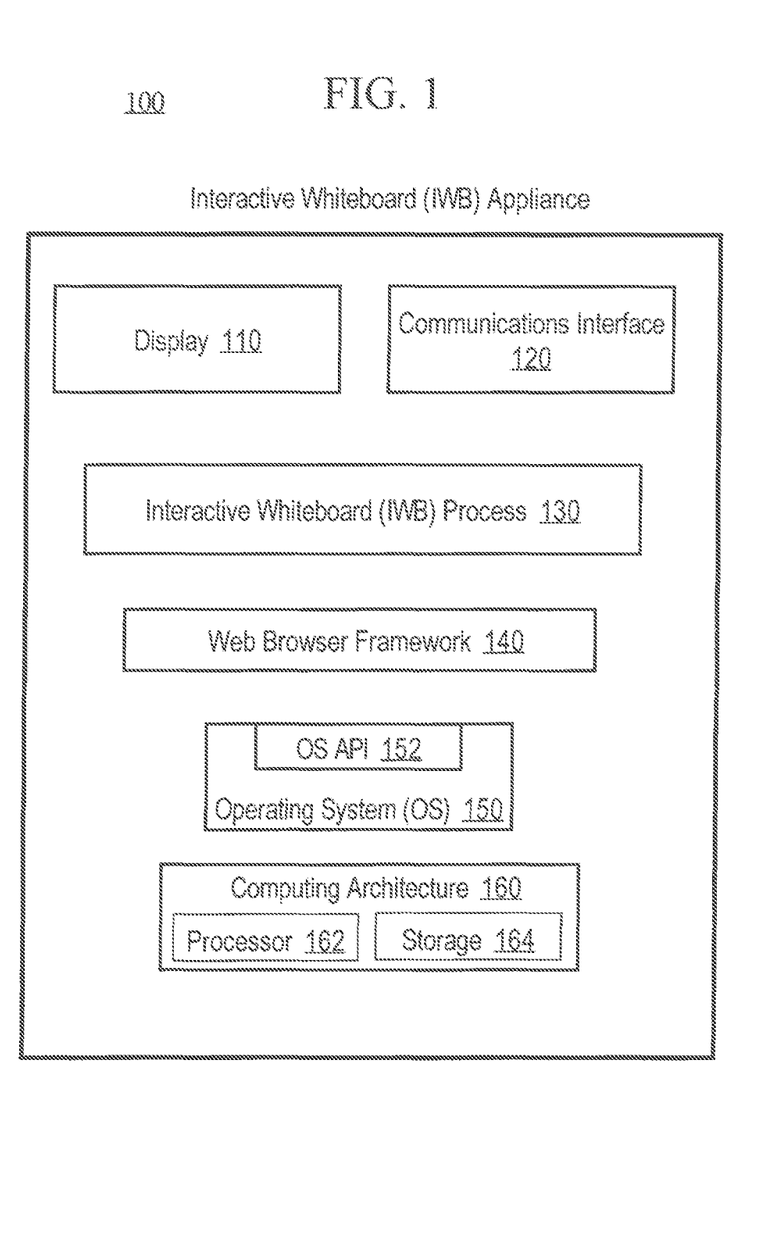
FIG. 1 is a block diagram that depicts an interactive whiteboard (IWB) appliance according to an embodiment.

FIG. 1 is a block diagram that depicts an interactive whiteboard (IWB) appliance 100 according to an embodiment. IWB appliance 100 is an electronic whiteboard that supports interactive electronic whiteboard sessions via an annotation window. IWB appliance 100 also provides Web browser-based functionality to support Web-based services, such as Web-based videoconferencing.

In the example depicted in FIG. 1, IWB appliance 100 includes a display 110, a communications interface 120, an interactive whiteboard (IWB) process 130, a Web browser framework 140, an operating system (OS) 150 having an OS application programming interface (API) 152, and a computing architecture 160 that includes one or more processors 162 and storage 164. IWB appliance 100 may include fewer or more components that those depicted in FIG. 1 and described herein and the particular components used may vary depending upon a particular implementation and IWB appliance 100 is not limited to a particular set of components or features. For example, IWB appliance 100 may also include manual controls, such as buttons, slides, etc., not depicted in FIG. 1, for performing various functions on mobile device, such as powering on/off or changing the state of interactive whiteboard appliance 100 and/or display 110.

Display 110 may be implemented by any type of display that displays images and information to a user and may also be able to receive user input and embodiments are not limited to any particular implementation of display 110. As one non-limiting example, display 110 may be a touchscreen display that both displays information to users and allows user to select graphical user interface objects and draw and annotate, for example via manual touch, an instrument such as an electronic pen, or both. Interactive whiteboard appliance 100 may have any number of displays 110 or operation panels, of similar or varying types, located anywhere on interactive whiteboard appliance 100.

Communications interface 120 may include computer hardware, software, or any combination of computer hardware and software to provide wired and/or wireless communications between IWB appliance 100 and other devices via one or more networks, such as collaboration servers, client devices, etc. The particular components for communications interface 120 may vary depending upon a particular implementation and embodiments are not limited to any particular implementation of communications interface 120.

Interactive whiteboard (IWB) process 130 executes on interactive whiteboard appliance 100 and provides various functionality. For example, IWB process 130 may instantiate one or more windows on IWB appliance 100 including, but not limited to, an annotation window that provides collaboration and drawing capabilities, and a Web browser window that provides Web-based functionality, such as videoconferencing, etc. IWB process 130 may be configured to instantiate and manage an annotation window and multiple Web browser windows via Web browser framework 140 and OS 150, as described in more detail hereinafter. For example, IWB process 130 may instantiate and manage an annotation window and two Web browser windows, where each Web browser window supports a videoconferencing session.

Web browser framework 140 provides HTML-compliant Web browser capabilities and control to IWB process 130. Web browser framework 140 may be an embedded framework that allows HTML-compliant Web browser capabilities and control to be embedded into IWB process 130. Web browser framework 140 may support a broad range of programming languages and operating systems and include an application program interface (API) that provides access to HTML-compliant Web browser capabilities and control, while insulating IWB process 130 from the implementation details. One non-limiting example of Web browser framework 140 is the Chromium Embedded Framework (CEF). Web browser framework 140 may be implemented separate from IWB process 130 or integrated into IWB process 130, depending upon a particular implementation.

Operating system 150 executes on computing architecture 160 and may be any type of operating system that may vary depending upon a particular implementation and embodiments are not limited to any particular implementation of operating system 150. Operating system 150 may include multiple operating systems of varying types, depending upon a particular implementation. OS API 152 provides access to functionality provided by OS 150. For example, interactive whiteboard process 130 may use OS API 152 to initiate or instantiate functionality provided by OS 150. According to one embodiment, OS 150 supports the instantiation and management of multiple windows. This may include, for example, providing functionality that can be accessed by IWB process 130 via OS API 152 to instantiate and manage multiple windows.

Computing architecture 160 may include various elements that may vary depending upon a particular implementation and interactive whiteboard appliance 100 is not limited to any particular computing architecture 160. In the example depicted in FIG. 1, computing architecture includes a processor 162 and storage 164. Processor 162 may be any number and types of processors and storage 164 may be implemented by any number and types of memories, including volatile memory and non-volatile memory, which may vary depending upon a particular implementation. Computing architecture 160 may include additional hardware, firmware and software elements that may vary depending upon a particular implementation.

III. Managing Windows Using Opacity

According to one embodiment, IWB process 130 is configured to cause multiple windows to be instantiated and displayed on the display 110 of IWB appliance 100 in full screen mode and select and dynamically change the opacity of one or more topmost windows so that the contents of the multiple windows may be viewed concurrently by a user.

Figure 2:
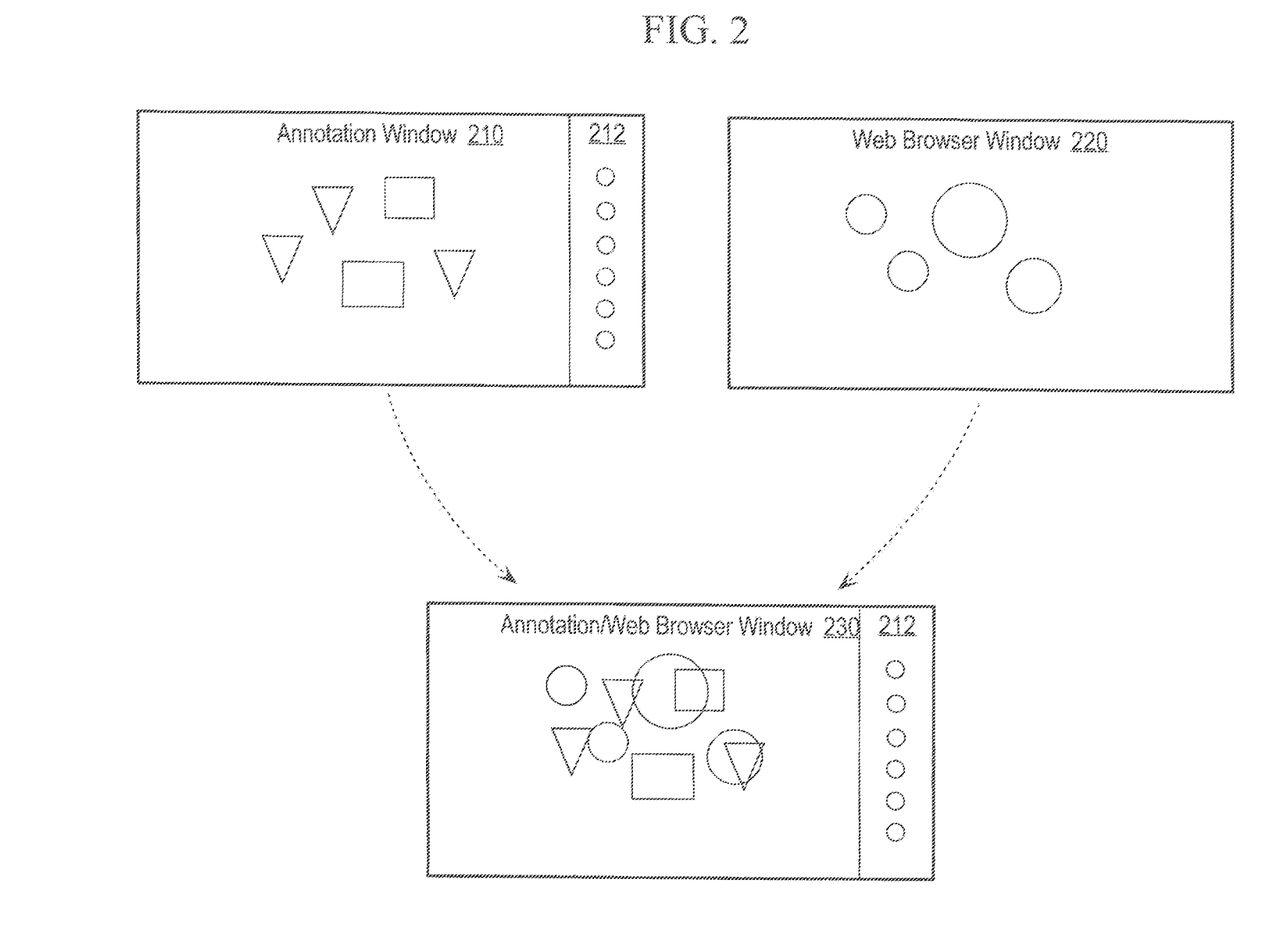
FIG. 2 depicts an example of an IWB process causing cause multiple windows to be instantiated and displayed on the display of an IWB appliance in full screen mode in a manner that allows the contents of the multiple windows to be viewed concurrently.

FIG. 2 depicts an example of IWB process 130 causing cause multiple windows to be instantiated and displayed on the display 110 of IWB appliance 100 in full screen mode in a manner that allows the contents of the multiple windows to be viewed concurrently. IWB process 130 causes an annotation window 210, having a set of controls 212, to be instantiated and displayed on display 110. This may be accomplished, for example, by IWB process 130 accessing one or more functions of OS 150 via OS API 152. IWB process 130 also specifies that the annotation window 210 is to be displayed in full screen mode and designated as the topmost window. This may be accomplished, for example, by IWB process 130 accessing one or more functions of OS 150 via OS API 152 to designate the annotation window 210 as a topmost window. The use herein of the term "topmost"

is not intended to limit embodiments to any particular OS that may use this term when managing the "z order" of windows.

Annotation window 210 includes a set of objects, depicted in FIG. 2 in the form of triangles and rectangles, that may be created, edited and annotated by one or more users, for example during a meeting. Controls 212 allow a user to invoke one or more functions with respect to the annotation window 210, such as saving the contents of the annotation window 210, adjusting size, scaling, color, etc. Controls 212 may also allow a user to select any window currently instantiated on IWB appliance 100, including non-topmost windows. Furthermore, controls 212 may allow a user to change the window that is designated as the topmost window and then access controls for the new topmost window. For example, suppose that annotation window 210 is the current topmost window and Web browser window 220 is a non-topmost window that is hosting a videoconferencing session. A user may use controls 212 to select Web browser window 220 as the current topmost window and then access controls for the videoconferencing session in the Web browser window 220. According to one embodiment, controls 212 allow control over non-topmost windows, such as Web browser window, even when the opacity level for the annotation window 210 is set at 100%, referring to no transparency, so that commands may be "passed through" to non-topmost windows.

IWB process 130 also causes a Web browser window 220 to be instantiated and displayed on display 110. This may be accomplished, for example, by IWB process 130 accessing one or more functions of OS 150 via OS API 152 and one or more functions provided by Web browser framework 140. Web browser window 220 supports Web-based functionality, including, without limitation, Web-based video conferencing. IWB process 130 also specifies that the Web browser window 220 is to be displayed in full screen mode and designated as a non-topmost window. Normally, annotation window 210 would visually obscure Web browser window 220, since annotation window 210 is designated as a topmost window. According to one embodiment, however, IWB process 130 selects an opacity level, i.e., a level of transparency, for the annotation window 210 that allows the contents of both the annotation window 210 and the Web browser window 220 to be visually seen to a user, even though the annotation window 210 is designated as a topmost window. This may be accomplished, for example, by IWB process 130 issuing one or more OS commands via the OS API 152 of OS 150. For example, some operating systems allow an opacity property to be designated for a window. This effectively aggregates for display the contents of both windows and is depicted in FIG. 2 as annotation/Web browser window 230, even though two separate windows are instantiated. The level of opacity selected for annotation window 210 may vary depending upon a particular implementation and embodiments are not limited to particular opacity values. Additional example opacity values are described in more detail hereinafter.

Figure 3:
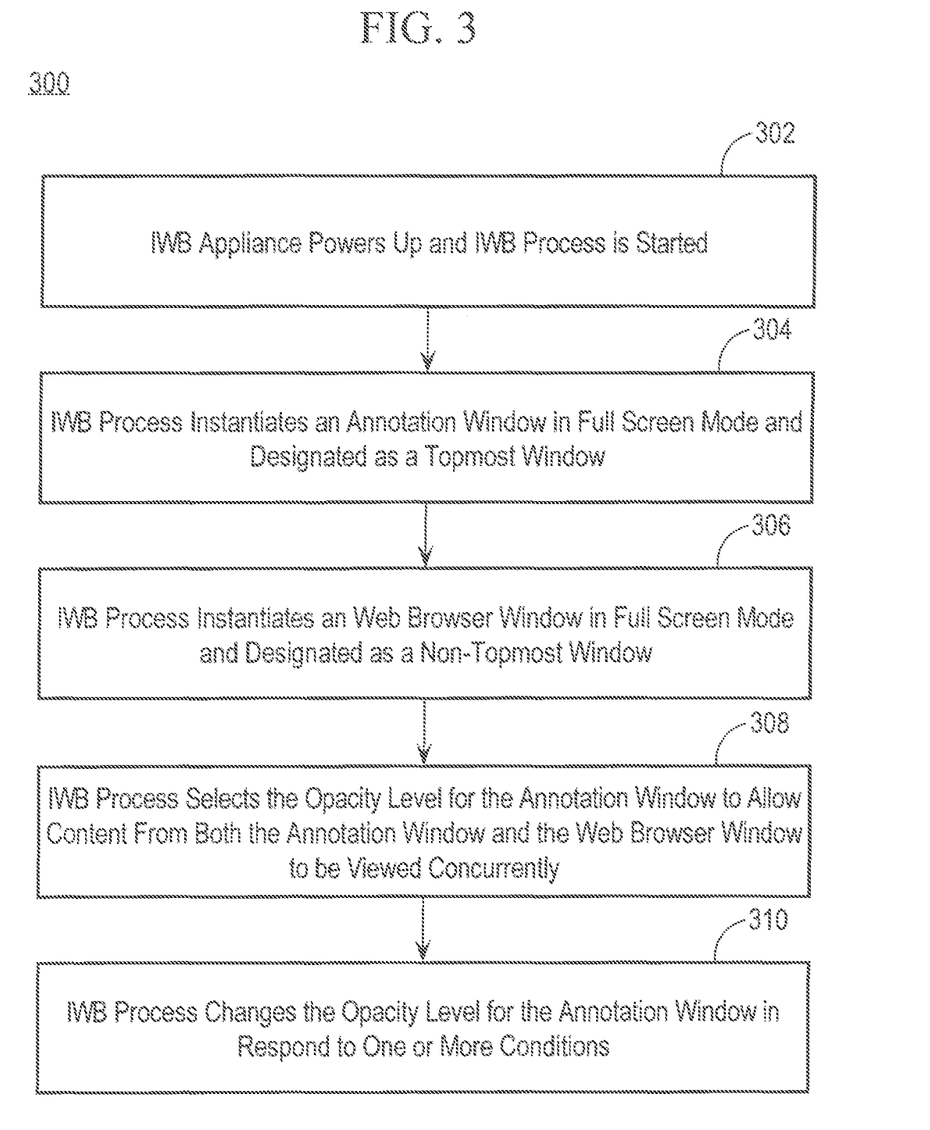
FIG. 3 is a flow diagram that depicts an approach for managing multiple windows on an IWB appliance using opacity settings, according to an embodiment.

FIG. 3 is a flow diagram 300 that depicts an approach for managing multiple windows on an IWB appliance using opacity settings, according to an embodiment. In step 302, IWB appliance 100 is powered up and IWB process 130 is started. IWB appliance 100 may be configured to automatically start IWB process 130 upon startup or alternatively, a user may initiate IWB process 130 after startup, for example, by selecting a graphical user interface control on the display 110 of IWB appliance 100.

In step 304, IWB process 130 instantiates an annotation window in full screen mode and designates the annotation window as the topmost window. In step 306, IWB process 130 instantiates a Web browser window in full screen mode and designates the Web browser window as a non-topmost window. In step 308, IWB process 130 selects the opacity level, i.e., the level of transparency, for the annotation window to allow content from both the annotation window and the Web browser window to be viewed concurrently. The selected opacity level for the annotation window may be considered to be an initial opacity level for the annotation window and may be selected after the annotation window has been instantiated or after the Web browser window has been instantiated, embodiments are not limited to either approach.

In step 310, IWB process 130 changes the opacity level of the annotation window in response to one or more conditions. This may include increasing or decreasing the opacity level of the annotation window, depending upon the particular conditions that exist. Example conditions and the way in which the opacity level of the annotation window is changes are described in more detail hereinafter. Step 310 may be repeated any number of times, with the opacity level of the annotation window increasing or decreasing to increase the visibility of portions of the annotation window or the Web browser window, respectively, depending upon the conditions detected at any particular time.

A. Conditions for Changing Opacity

A wide variety of conditions may be used to trigger changing the opacity level of the annotation window, depending upon a particular implementation. These may include conditions associated with the annotation window, conditions associated with a Web browser window, other conditions, or any combination thereof.

According to one embodiment, conditions associated with the annotation window include activity detected with respect to the annotation window. For example, the presence of an object, such as a human finger or pen, within a specified distance of the display 110 at the location of the annotation window, e.g., "hovering" over the annotation window, or contact with the display 110 at the location of the annotation window may constitute a condition that triggers a change in the opacity level of the annotation window. This may be detected, for example, by generation of a hovering or display touch event by the OS 150. For example, a user may begin to draw in the annotation window, which triggers an event by OS 150 that is detected by IWB process 130. In response to this condition, IWB process 130 increases the opacity of the annotation window, for example, to a high level. This improves the user experience by making it easier for participants to see the drawing occurring in the annotation window. As another example, in response to detecting a "hovering" condition over the annotation window, or selection of a page change control of the annotation window, the opacity level of the annotation window may be set to medium-high. Other example conditions associated with the annotation window include, without limitation, actions made with respect to one or more controls associated with the annotation window, such as zooming, erasing, undo/redo, changing pen attributes, etc. Other examples include detection of an audio or video connection to the IWB appliance 100, for example, via an audio or video interface of IWB appliance 100. For example, a user may connect a video source to IWB appliance 100 to play content in the annotation window. Similarly, a user may connect a device to a USB interface of IWB appliance 100.

The opacity level of the annotation window may be automatically returned to a normal or default level after a specified time of inactivity with respect to the annotation window. For example, suppose that a user had been drawing in the annotation window and the opacity level of the annotation window was set to high. Suppose further that the user stops drawing and no other activity is detected with respect to the annotation window for a default amount of time of three minutes. In response to detecting that no activity occurred with respect to the annotation window for three minutes, IWB process 130 changes the opacity level of the annotation window back to the default level. In this example, the condition used to trigger the change the opacity level of the annotation window is the occurrence of a specified amount of time with no activity in the annotation window. The default opacity level and the inactivity threshold may be specified by a user, as described in more detail hereinafter.

According to one embodiment, conditions associated with a Web browser window may cause a change in the opacity level of the annotation window. One example condition is activity detected with respect to the Web browser window. This may include, for example, audio detected in the Web browser window, indicating active conversation. This may be detected by monitoring an audio stream associated with the Web browser window. For example, IWB process 130 may access one or more OS functions via OS API 152 to monitor an audio stream associated with the Web browser window. As another example, a local microphone level may be monitored to detect activity in the Web browser window. In response to detecting a change in the audio stream indicative of a conversation, IWB process 130 decreases the opacity level of the annotation window, for example, to medium low, so that users of the IWB appliance 100 can more easily view the contents of the Web browser window, such as other participants of a video conferencing session. IWB process 130 may continue to monitor the Web browser window and in response to continued activity in the Web browser window, for example in the form of continued conversations, IWB process 130 may further decrease the opacity of the annotation window. For example, IWB process 130 may decrease the opacity level of the annotation window from medium-low to low. This may occur immediately or after a specified amount of time, and the specified amount of time may be user-configurable. IWB process 130 may return the opacity level of the annotation window to a higher level in response to detecting a disconnection or termination of an electronic meeting, such as a videoconferencing session, in the Web browser window, or activity associated with the annotation window.

B. Opacity Levels and Controls

Figures 4A, 4B:
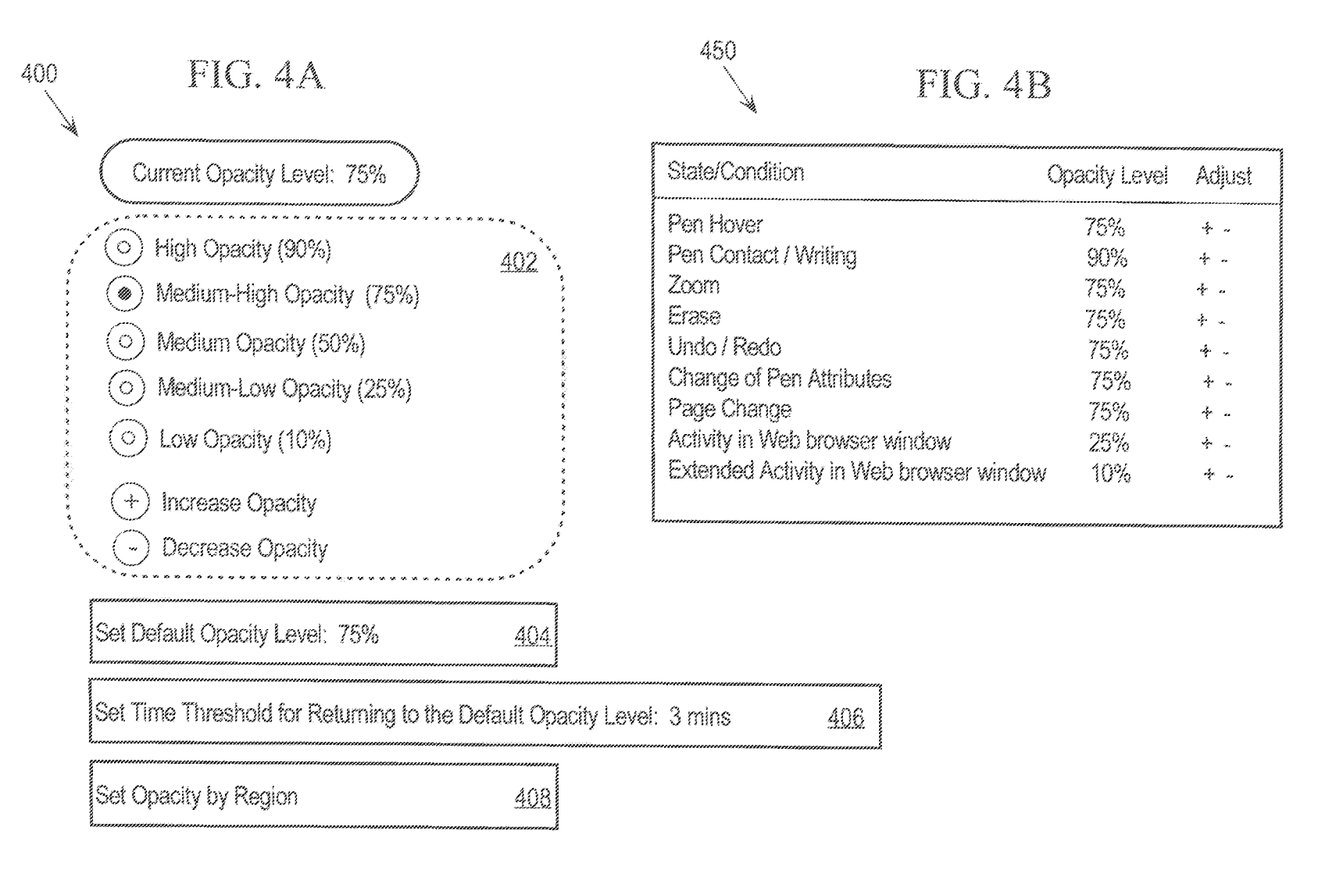
FIG. 4A depicts example graphical user interface controls that may be invoked via controls and that allow a user to specify opacity levels and settings.
FIG. 4B depicts a table of states/conditions and corresponding opacity levels that may be specified by a user.

As described herein, different opacity levels may be used in response to different conditions and opacity levels may be specified by a user, such as an administrator or end user. According to one embodiment, controls 212 include a control which, when selected, allows a user to specify opacity levels and settings for annotation window 210. FIG. 4A depicts example graphical user interface controls 400 that may be invoked via controls 212 and that allow a user to specify opacity levels and settings. The graphical user interface controls 400 may be displayed in the area designated for controls 212 or may be displayed elsewhere on display 110, for example, within or adjacent to annotation window 210.

As depicted in FIG. 4A, graphical user interface controls 400 include controls 402 that allow a user to specify a current opacity level, either by specifying one of a plurality of pre-specified opacity levels, e.g., 10%, 25%, 50%, 75% or 90%, and/or by using increment and decrement controls. For purposes of explanation, as used herein an opacity level of 100% for a particular window means that the particular window is completely opaque and has no transparency, while an opacity level of 0% means that the particular window has complete transparency. The pre-specified opacity levels may be user configurable and specified, for example, by an administrator, and may be any level that may vary depending upon a particular implementation.

Graphical user interface controls 400 also include a control 404 that allow a user to specify a default opacity level to be used when annotation window 210 is displayed concurrently with one or more other windows. A control 406 is also provided to allow a user to specify a time threshold for returning to the default opacity level. This threshold may be used by IWB process 130 to know when to return to the default opacity level from a higher opacity level. For example, suppose that the default opacity level is 75% and that the current opacity level has been set to 90% in response a detecting of writing on the annotation window 210. After expiration of the threshold amount of time, which in the current example is three minutes, without any actions or conditions detected with respect to the annotation window, IWB process 130 changes the current opacity level of the annotation window to the default opacity level. This may improve the user experience by making the Web browser window more visible to users after a time of inactivity with respect to the annotation window. The threshold may also be used to know when to return to the default opacity level from a lower opacity level. For example, suppose that the default opacity level is 75% and that the current opacity level has been set to 25% in response a detecting an ongoing conversation in the Web browser window. After expiration of the three minute threshold, without any actions or conditions detected with respect to the Web browser window, IWB process 130 changes the current opacity level of the annotation window to the default opacity level. This may improve the user experience by making the annotation window more visible to users after a time of inactivity with respect to the Web browser window.

FIG. 4B depicts a table 450 of states/conditions and corresponding opacity levels that may be specified by a user. When IWB process 130 detects that a state/condition in table 450 exists, then IWB process 130 changes the current opacity level to the opacity level that corresponds to the state/condition in table 450. Graphical user interface controls may be provided to allow a user to edit, add and delete data in table 450. The opacity controls and settings depicted in FIGS. 4A and 4B are provided as examples and embodiments are not limited to the particular opacity controls and settings depicted in FIGS. 4A and 4B, and described herein.

C. Regions and Color Shifting

Figure 5:
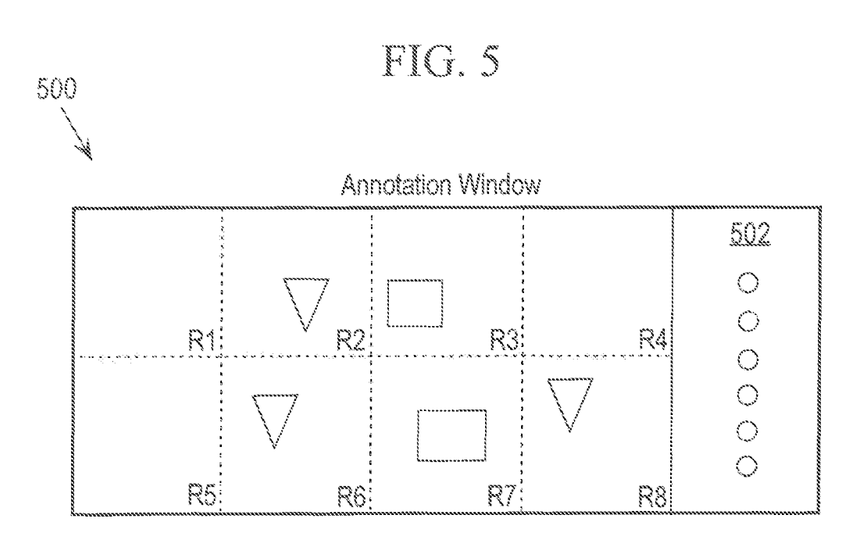
FIG. 5 depicts an annotation window that has been divided into eight regions.

Embodiments are described herein in the context of changing the opacity level of the entire annotation window 210 for purposes of explanation only and embodiments are not limited to this context. According to one embodiment, the opacity level of the annotation window 210 may be selectively changed for particular regions of the annotation window 210 and not changed for other regions of the annotation window 210. FIG. 5 depicts an annotation window 500 that has been divided into eight regions, identified in FIG. 5 as R1-R8. Annotation window 500 also includes controls 502 that are similar to controls 212 of FIG. 2. The regions R1-R8 may be user defined or pre-defined, based upon the capabilities of the OS 150 and other functionality of IWB appliance 100. The number and shape of regions may vary, depending upon a particular implementation, and embodiments are not limited to any particular number and shape of regions. For example, regions may be automatically defined to provide sufficient granularity, based upon the content of the annotation window 210. Regions may be non-overlapping, as depicted in FIG. 5, or regions may be overlapping.

According to one embodiment, when one or more conditions are detected with respect to annotation window 500, a determination is made of the one or more regions that correspond to the detected one or more conditions. Then, the opacity of the determined one or more regions is selectively changed, without changing the opacity of other regions. This may improve the user experience by reducing the amount of non-topmost windows that are obscured by the change in opacity. For example, suppose that annotation window 500 is instantiated and designated as a top-most window and that a Web browser window is instantiated and designated as a non-topmost window. Suppose further that the Web browser window is used to host a video conference session and that the opacity of annotation window 500 is initially set to 50%, so that content from both the annotation window 500 and the video conference session can be viewed concurrently. Suppose further that active drawing is detected in region R3 of annotation window 500. This may be detected, for example, by a drawing event generated by OS 150. The opacity of region R3 is increased from 50% to 75%, making region R3 more opaque, so that users can more easily see the drawing that is actively occurring in region R3. The opacity of the other regions R1, R2 and R4-R8 may remain unchanged, so that users may continue to concurrently view the portions of the videoconferencing session appearing underneath the other regions R2, R2 and R4-R8. This may provide a more favorable user experience by increasing the opacity only in the one or more regions in which activity is occurring on the annotation window.

According to one embodiment, to further enhance the user experience, the opacity level of the other regions where activity or conditions was not detected is decreased, which provides increased visibility to the Web browser window in these regions. In the present example this means that the annotation window is made more opaque, i.e., more visible, in the one or more regions where the activity or conditions were detected, and less opaque, i.e., less visible, in the one or more other regions where the activity or conditions were not detected, which in turn makes the videoconferencing session more visible in these one or more other regions.

According to one embodiment, the opacity for regions adjacent to a region for which activity or conditions have been detected is also changed. For example, referring to the prior example where drawing was detected in region R3 of annotation window 500, the opacity of regions R3 and R2 may be increased based, for example, on the close proximity of objects in regions R3 and R2.

According to one embodiment, IWB process 130 provides the capability for users to manually and selectively change the opacity of annotation window 210 on a region-by-region basis. For example, as depicted in FIG. 4A, graphical user interface controls 400 include a control 408 which, when selected, allows a user to manually and selectively change the opacity of annotation window 210 on a region-by-region basis. As one example, in response to a selection of control 408, IWB process 130 may depict annotation window 210 with an overlay of regions and controls that allow a user to select a particular region and then specify opacity parameters for the selected region, as previously described herein with respect to FIG. 4A.

According to one embodiment, IWB process 130 is configured to detect content of interest in a Web browser window and then adjust the opacity level of the annotation window 210 in one or more regions that overlap the content of interest so that the content of interest is not obscured by the annotation window. The content of interest may include different types of information that may vary depending upon a particular implementation. For example, suppose that Web browser window 220 is currently supporting a videoconferencing session. In this example, IWB process 130 is configured to identify locations in the Web browser window that contain faces of the participants of the videoconferencing session. Thus, in this example, the "content of interest" is the faces of the participants of the videoconferencing session. IWB process 130 identifies the locations of the faces of the participants within the Web browser window and reduces the opacity of the annotation window at locations that overlap the locations of the faces of the participants within the Web browser window. This may provide a more favorable user experience by making the faces of the participants in the videoconferencing session more visible to users. Identifying content of interest within content displayed in a Web browser window may be accomplished using a wide variety of techniques that may vary depending upon a particular implementation and embodiments are not limited to any particular approach.

According to one embodiment, IWB process 130 is configured to automatically change the drawing color of a pen or stylus when the current color of the pen or stylus is substantially similar to a color of the current location of the pen or stylus on annotation window 210 or Web browser window 220. The pen color may be changed slightly if the opacity of the annotation window 210 is less than 100%, and the color of the pen is the same as the color in the corresponding region of the Web browser window 220. The amount of opacity may have an effect on perceived pen color and according to one embodiment, the amount of opacity is used as a criteria for selecting a new pen color. For example, suppose that a user starts to draw with a pen at a particular location on annotation window 210. Suppose further that the current color of the annotation window 210 at the particular location is black and that the current color of the pen or stylus is also black. In this situation, IWB process 130 detects that the current color of the pen or stylus is substantially similar to the color of the annotation window 210 at the particular location. IWB may detect the current color of the pen or stylus and the color of the annotation window 210 at the particular location by making calls to OS 150 via OS API 152. IWB process 130 may determine whether the current color of the pen or stylus is substantially similar to the color of the annotation window 210 at the particular location using a wide variety of approaches and embodiments are not limited to any particular approach. As one non-limiting example, IWB process 130 may compare color values using a threshold to determine whether the current color of the pen or stylus is substantially similar to the color of the annotation window 210 at the particular location. IWB process 130 then automatically changes the color of the pen or stylus to a color that better contrasts with the current color of the annotation window 210 at the particular location. This may be accomplished by selecting a color value for the pen or stylus that is different than the color of the annotation window 210 at the particular location by at least the threshold amount. Automatically changing the drawing color of a pen or stylus may be a user-selectable feature. For example, graphical user interface controls 400 may include a control for enabling or disabling this feature.

IV. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
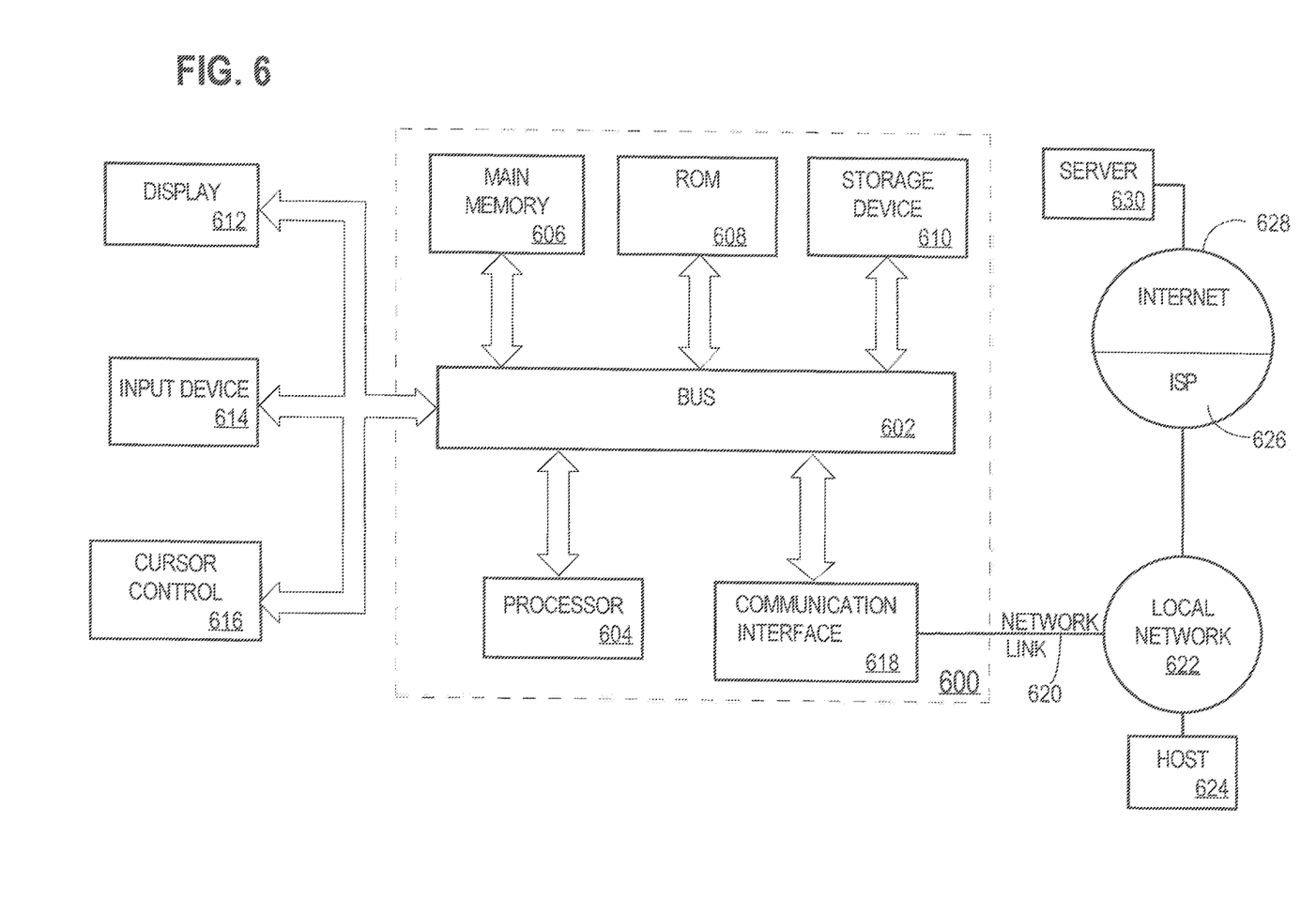
FIG. 6 is a block diagram that depicts an example computer system upon which embodiments may be implemented.

FIG. 6 is a block diagram that depicts an example computer system 600 upon which embodiments may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. Although bus 602 is illustrated as a single bus, bus 602 may comprise one or more buses. For example, bus 602 may include without limitation a control bus by which processor 604 controls other devices within computer system 600, an address bus by which processor 604 specifies memory locations of instructions for execution, or any other type of bus for transferring data or signals between components of computer system 600.

An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic or computer software which, in combination with the computer system, causes or programs computer system 600 to be a special-purpose machine. According to one embodiment, those techniques are performed by computer system 600 in response to processor 604 processing instructions stored in main memory 606. Such instructions may be read into main memory 606 from another non-transitory computer-readable medium, such as storage device 610. Processing of the instructions contained in main memory 606 by processor 604 causes performance of the functionality described herein. In alternative embodiments, hard-wired circuitry may be used in place of or in combination with software instructions to implement the embodiments. Thus, embodiments are not limited to any specific combination of hardware circuitry and software.

The term "non-transitory computer-readable medium" as used herein refers to any non-transitory medium that participates in providing data that causes a computer to operate in a specific manner. In an embodiment implemented using computer system 600, various computer-readable media are involved, for example, in providing instructions to processor 604 for execution. Such media may take many forms, including but not limited to, non-volatile and volatile non-transitory media. Non-volatile non-transitory media includes, for example, optical or magnetic disks, such as storage device 610. Volatile non-transitory media includes dynamic memory, such as main memory 606. Common forms of non-transitory computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of non-transitory computer-readable media may be involved in storing instructions for processing by processor 604. For example, the instructions may initially be stored on a storage medium of a remote computer and transmitted to computer system 600 via one or more communications links. Bus 602 carries the data to main memory 606, from which processor 604 retrieves and processes the instructions. The instructions received by main memory 606 may optionally be stored on storage device 610 either before or after processing by processor 604.

Computer system 600 also includes a communication interface 618 coupled to bus 602. Communication interface 618 provides a communications coupling to a network link 620 that is connected to a local network 622. For example, communication interface 618 may be a modem to provide a data communication connection to a telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be processed by processor 604 as it is received, and/or stored in storage device 610, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An interactive whiteboard appliance comprising:
    a display;
    a communications interface;
    one or more processors;
    one or more memories; and
    an interactive whiteboard application configured to:
        cause a Web browser window to be instantiated on the interactive whiteboard appliance, displayed on the display of the interactive whiteboard appliance, and designated as a non-topmost window,
        cause an annotation window to be instantiated on the interactive whiteboard appliance, displayed on the display of the interactive whiteboard appliance, and designated as a topmost window, wherein the annotation window is displayed at least partially on top of the Web browser window on the display of the interactive whiteboard appliance, wherein the annotation window includes a plurality of content regions and the plurality of content regions includes at least a first content region and a second content region,
        detect a user selection of the first content region of the annotation window, and
        in response to detecting the user selection of the first content region of the annotation window, automatically and selectively increasing an opacity level of the first content region of the annotation window without changing an opacity level of the second content region of the annotation window.

2. The interactive whiteboard appliance of claim 1, wherein the interactive whiteboard application is further configured to select an initial opacity level of the first content region of the annotation window to allow at least a portion of the Web browser window that would otherwise be visually obscured by the first content region of the annotation window to be visually seen through the first content region of the annotation window.

3. The interactive whiteboard appliance of claim 1, wherein the interactive whiteboard application is further configured to, in response to detecting the user selection of the first content region of the annotation window, perform one or more of:
    increase an opacity level of one or more other content regions, from the plurality of content regions, that are adjacent to the first content region, or
    decrease an opacity level of one or more other content regions, from the plurality of content regions, that are not adjacent to the first content region.

4. The interactive whiteboard appliance of claim 1, wherein the user selection of the first content region of the annotation window includes one or more of a user positioning a pen or stylus within a specified distance of or in contact with the first content region of the annotation window on the display of the interactive whiteboard appliance, or a user selecting a graphical user interface control that corresponds to the annotation window.

5. The interactive whiteboard appliance of claim 1, wherein the interactive whiteboard application is further configured to decrease the opacity level of the first content region of the annotation window in response to one or more of a user action made with respect to the Web browser window or detection of an audio signal that corresponds to the Web browser window.

6. The interactive whiteboard appliance of claim 1, wherein the interactive whiteboard application is further configured to:
    determine whether any user actions are made with respect to the annotation window during a specified amount of time, and
    in response to determining that no user actions were made with respect to the annotation window during the specified amount of time, decrease the opacity level of the first content region of the annotation window.

7. One or more non-transitory computer-readable media storing instructions which, when processed by one or more processors, cause:
    an interactive whiteboard application executing on a computing device having a display to:
        cause a Web browser window to be instantiated on the interactive whiteboard appliance, displayed on the display of the interactive whiteboard appliance and designated as a non-topmost window,
        cause an annotation window to be instantiated on the interactive whiteboard appliance, displayed on the display of the interactive whiteboard appliance, and designated as a topmost window, wherein the annotation window is displayed at least partially on top of the Web browser window on the display of the interactive whiteboard appliance, wherein the annotation window includes a plurality of content regions and the plurality of content regions includes at least a first content region and a second content region,
        detect a user selection of the first content region of the annotation window, and
        in response to detecting the user selection of the first content region of the annotation window, automatically and selectively increasing an opacity level of the first content region of the annotation window without changing an opacity level of the second content region of the annotation window.

8. The one or more non-transitory computer-readable media of claim 7, further comprising additional instructions which, when processed by the one or more processors, cause the interactive whiteboard application to select an initial opacity level of the first content region of the annotation window to allow at least a portion of the Web browser window that would otherwise be visually obscured by the first content region of the annotation window to be visually seen through the first content region of the annotation window.

9. The one or more non-transitory computer-readable media of claim 7, further comprising additional instructions which, when processed by the one or more processors, cause the interactive whiteboard application is further configured to, in response to detecting the user selection of the first content region of the annotation window, perform one or more of:
increase an opacity level of one or more other content regions, from the plurality of content regions, that are adjacent to the first content region, or
decrease an opacity level of one or more other content regions, from the plurality of content regions, that are not adjacent to the first content region.

10. The one or more non-transitory computer-readable media of claim 7, wherein the user selection of the first content region of the annotation window includes one or more of a user positioning a pen or stylus within a specified distance of or in contact with the first content region of the annotation window on the display of the interactive whiteboard appliance, or a user selecting a graphical user interface control that corresponds to the annotation window.

11. The one or more non-transitory computer-readable media of claim 7, wherein the interactive whiteboard application is further configured to decrease the opacity level of the first content region of the annotation window in response to one or more of a user action made with respect to the Web browser window or detection of an audio signal that corresponds to the Web browser window.

12. The one or more non-transitory computer-readable media of claim 7, further comprising additional instructions which, when processed by the one or more processors, cause the interactive whiteboard application to:
determine whether any user actions are made with respect to the annotation window during a specified amount of time, and
in response to determining that no user actions were made with respect to the annotation window during the specified amount of time, decrease the opacity level of the first content region of the annotation window.

13. A computer-implemented method comprising:
an interactive whiteboard application executing on a computing device having a display:
causing a Web browser window to be instantiated on the interactive whiteboard appliance, displayed on the display of the interactive whiteboard appliance and designated as a non-topmost window,
causing an annotation window to be instantiated on the interactive whiteboard appliance, displayed on the display of the interactive whiteboard appliance and designated as a topmost window, wherein the annotation window is displayed at least partially on top of the Web browser window on the display of the interactive whiteboard appliance, wherein the annotation window includes a plurality of content regions and the plurality of content regions includes at least a first content region and a second content region,
detecting a user selection of the first content region of the annotation window, and
in response to detecting the user selection of the first content region of the annotation window, automatically and selectively increasing an opacity level of the first content region of the annotation window without changing an opacity level of the second content region of the annotation window.

14. The computer-implemented method of claim 13, further comprising the interactive whiteboard application selecting an initial opacity level of the first content region of the annotation window to allow at least a portion of the Web browser window that would otherwise be visually obscured by the first content region of the annotation window to be visually seen through the first content region of the annotation window.

15. The computer-implemented method of claim 13, further comprising the interactive whiteboard application, in response to detecting the user selection of the first content region of the annotation window, performing one or more of:
increasing an opacity level of one or more other content regions, from the plurality of content regions, that are adjacent to the first content region, or
decreasing an opacity level of one or more other content regions, from the plurality of content regions, that are not adjacent to the first content region.

16. The computer-implemented method of claim 13, wherein the user selection of the first content region of the annotation window includes one or more of a user positioning a pen or stylus within a specified distance of or in contact with the first content region of the annotation window on the display of the interactive whiteboard appliance, or a user selecting a graphical user interface control that corresponds to the annotation window.

17. The computer-implemented method of claim 13, further comprising the interactive whiteboard application decreasing the opacity level of the first content region of the annotation window in response to one or more of a user action made with respect to the Web browser window or detection of an audio signal that corresponds to the Web browser window.

18. The computer-implemented method of claim 13, further comprising the interactive whiteboard application:
determining whether any user actions are made with respect to the annotation window during a specified amount of time, and
in response to determining that no user actions were made with respect to the annotation window during the specified amount of time, decreasing the opacity level of the first content region of the annotation window.

* * * * *